(12) United States Patent
Hong et al.

(10) Patent No.: US 8,994,746 B2
(45) Date of Patent: Mar. 31, 2015

(54) SYSTEM AND METHOD FOR GENERATING A FLOW BASED ON MULTIPLE TYPES OF INTERACTIONS

(75) Inventors: Jerry Hong, Sunnyvale, CA (US); Fenghui Zhang, Redmond, WA (US); Lucas Visvikis Pettinati, San Jose, CA (US); Zhiting Xu, Redmond, WA (US); Lin Liao, Bothell, WA (US); Peng Li, Bellevue, WA (US); Jiajing Wang, Santa Clara, CA (US); Jin Yao, San Jose, CA (US); Manuel Frank Martinez, San Francisco, CA (US)

(73) Assignee: Google Inc., Mountain View, CA (US)

( * ) Notice: Subject to any disclaimer, the term of this patent is extended or adjusted under 35 U.S.C. 154(b) by 307 days.

(21) Appl. No.: 13/535,336

(22) Filed: Jun. 27, 2012

(65) Prior Publication Data

US 2014/0002483 A1 Jan. 2, 2014

(51) Int. Cl.
*G09G 5/00* (2006.01)
*G06T 11/20* (2006.01)

(52) U.S. Cl.
CPC .................................. *G06T 11/206* (2013.01)
USPC ......................................... 345/619; 345/440

(58) Field of Classification Search
USPC ....................................................... 345/619
See application file for complete search history.

(56) References Cited

U.S. PATENT DOCUMENTS

| | | | |
|---|---|---|---|
| 5,546,529 A | 8/1996 | Bowers et al. | |
| 5,652,834 A | 7/1997 | Jansson | |
| 6,216,134 B1 | 4/2001 | Heckerman et al. | |
| 6,621,798 B1 * | 9/2003 | Krishnan et al. | 370/256 |
| 7,051,029 B1 | 5/2006 | Fayyad et al. | |
| 2005/0081146 A1 * | 4/2005 | Tanaka et al. | 715/517 |
| 2005/0273730 A1 * | 12/2005 | Card et al. | 715/853 |
| 2010/0223219 A1 | 9/2010 | Kato et al. | |
| 2012/0218289 A1 * | 8/2012 | Rasmussen et al. | 345/619 |
| 2012/0221558 A1 * | 8/2012 | Byrne et al. | 707/723 |
| 2012/0254074 A1 * | 10/2012 | Flinn et al. | 706/4 |
| 2012/0254075 A1 * | 10/2012 | Flinn et al. | 706/4 |

OTHER PUBLICATIONS

International Search Report/Written Opinion of PCT/US2013/043918, DTD Jan. 7, 2014, 19 pages.

* cited by examiner

*Primary Examiner* — M Good Johnson
(74) *Attorney, Agent, or Firm* — Foley and Lardner LLP; John D. Lanza

(57) ABSTRACT

A system and method for generating a flow based on multiply types of interactions are provided. Data defining one or more sequences of multiple interactive nodes are received for the multiple interactive nodes, where each of the multiple interactive nodes corresponds to a particular type of interaction. One of the interactive nodes is designated as the starting interactive node and other interactive nodes are designated as intermediary interactive nodes, where the starting interactive node and at least one of the intermediary interactive nodes correspond to different types of interactions. Intermediary interactive nodes are connected to the starting interactive node based on the one or more sequences, where the connection includes one edge corresponding to a direct connection to the starting interactive node or multiple edges corresponding to an indirect connection via at least one other intermediary interactive node. Visualization data for the interactive nodes is generated and provided for display.

29 Claims, 10 Drawing Sheets

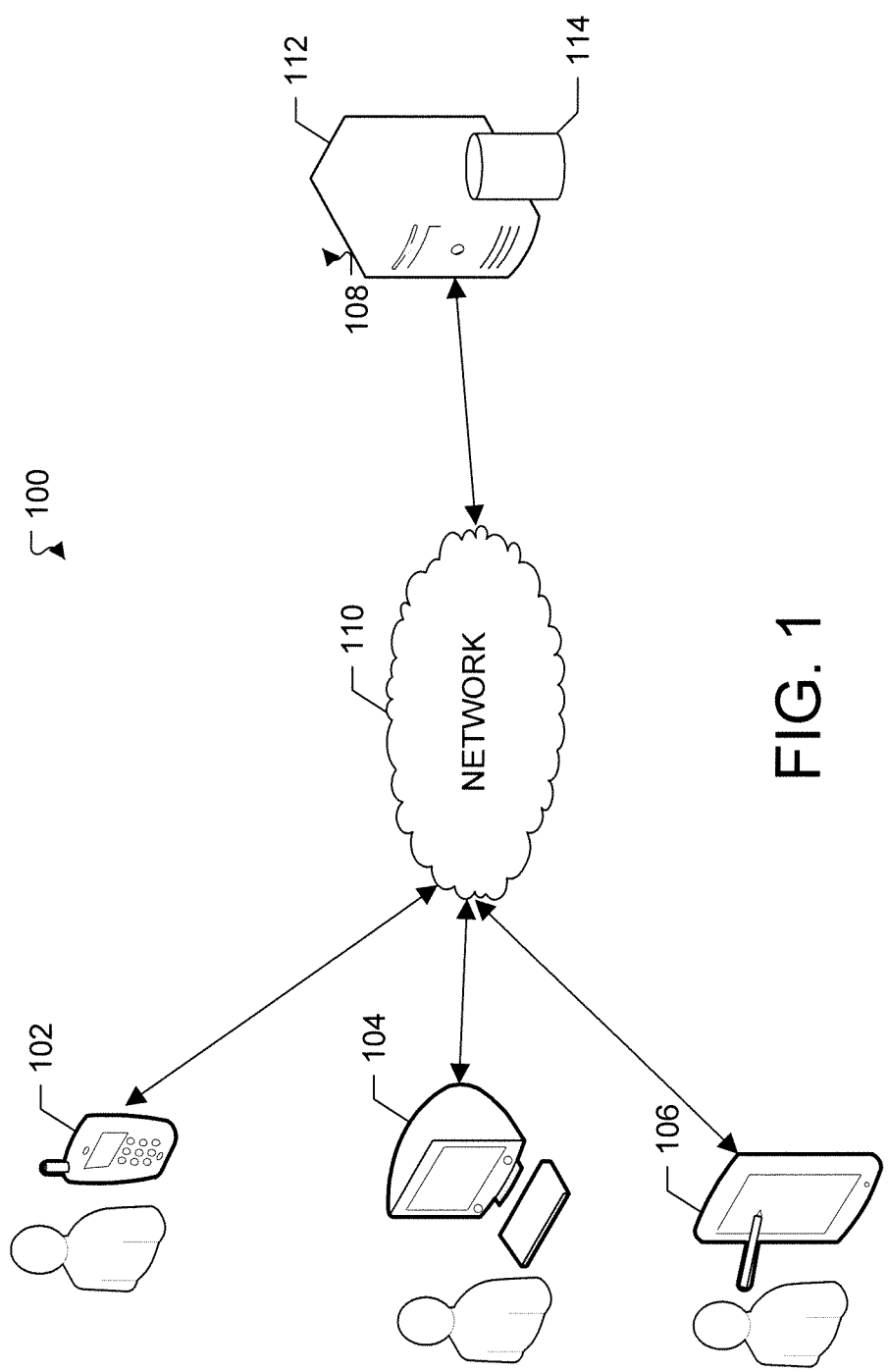

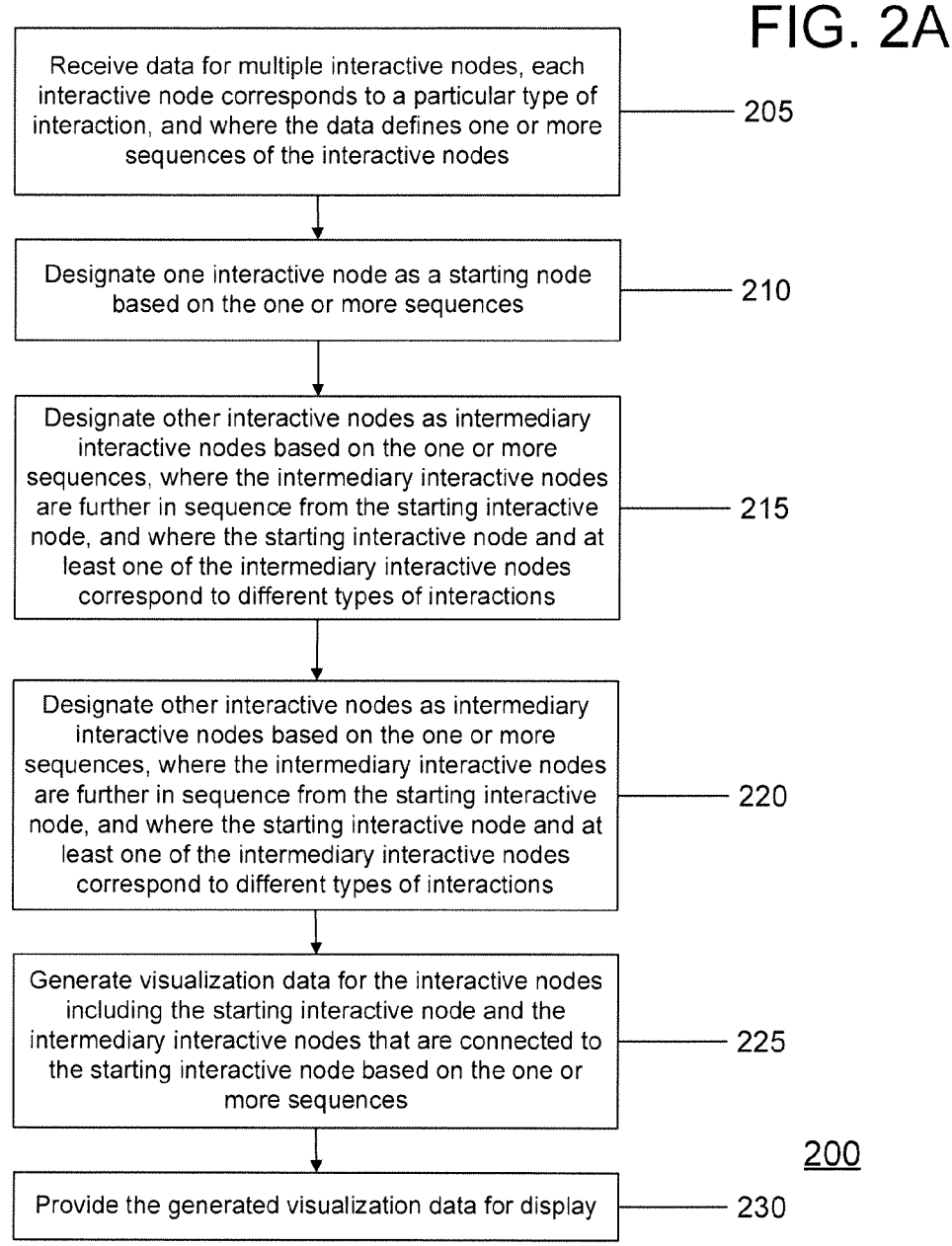

US 8,994,746 B2

SYSTEM AND METHOD FOR GENERATING A FLOW BASED ON MULTIPLE TYPES OF INTERACTIONS

FIELD

The subject technology generally relates to generating a flow, and in particular, relates to generating a flow based on multiple types of interactions.

BACKGROUND

Electronic device users often engage in one or more patterns of interactions with their respective electronic device. However, it is difficult to identify the one or more patterns of interactions due to the number of types of interactions that users engage in, as well as the number of users that engage in one or more interactions with their respective electronic device.

SUMMARY

The disclosed subject technology relates to a computer-implemented method for generating a flow based on multiple types of interactions. The method comprises receiving data for multiple interactive nodes, each interactive node corresponding to a particular type of interaction, wherein the data defines one or more sequences of the interactive nodes. The method further comprises designating one interactive node as a starting interactive node based on the one or more sequences. The method further comprises designating other interactive nodes as intermediary interactive nodes based on the one or more sequences, wherein the intermediary interactive nodes are further in sequence from the starting interactive node, and wherein the starting interactive node and at least one of the intermediary interactive nodes correspond to different types of interactions. The method further comprises connecting each intermediary interactive node to the starting interactive node based on the one or more sequences, wherein the connection comprises either one edge corresponding to a direct connection to the starting interactive node or multiple edges corresponding to an indirect connection via at least one other intermediary interactive node. The method further comprises generating visualization data for the multiple interactive nodes, wherein the visualization data comprises the starting interactive node and the intermediary interactive nodes that are connected to the starting interactive node based on the one or more sequences. The method further comprises providing the generated visualization data for display.

The disclosed subject technology further relates to a system for generating a flow based on multiple types of interactions. The system comprises one or more processors, and a machine-readable medium comprising instructions stored therein, which when executed by the processors, cause the processors to perform operations comprising receiving data for multiple interactive nodes, each interactive node corresponding to a particular type of interaction, wherein the data defines one or more sequences of the interactive nodes. The operations further comprise designating one interactive node as a starting interactive node based on the one or more sequences. The operations further comprise designating other interactive nodes as intermediary interactive nodes based on the one or more sequences, wherein the intermediary interactive nodes are further in sequence from the starting interactive node and wherein the starting interactive node and at least one of the intermediary interactive nodes correspond to different types of interactions. The operations further comprise connecting each intermediary interactive node to the starting interactive node based on the one or more sequences, wherein the connection comprises either one edge corresponding to a direct connection to the starting interactive node or multiple edges corresponding to an indirect connection via at least one other intermediary interactive node. The operations further comprise determining a total number of interactions represented by each of the multiple interactive nodes. The operations further comprise arranging one or more intermediate interactive nodes that are connected to the starting interactive node by an identical number of edges based on a total number of interactions of each of the one or more intermediate interactive nodes. The operations further comprise generating visualization data for the multiple interactive nodes, wherein the visualization data comprises the starting interactive node and the intermediary interactive nodes that are connected to the starting interactive node based on the one or more sequences. The operations further comprise providing the generated visualization data for display.

The disclosed subject technology further relates to a machine readable medium comprising instructions stored therein, which when executed by a processor, cause the processor to perform operations comprising receiving data for multiple interactive nodes, each interactive node corresponding to a particular type of interaction, wherein the data defines one or more sequences of the interactive nodes and wherein each interactive node comprises one or more related interactions belonging to a particular type of interaction. The operations further comprise designating one interactive node as a starting interactive node based on the one or more sequences. The operations further comprise designating other interactive nodes as intermediary interactive nodes based on the one or more sequences, wherein the intermediary interactive nodes are further in sequence from the starting interactive node, and wherein the starting interactive node and at least one of the intermediary interactive nodes correspond to different types of interactions. The operations further comprise connecting each intermediary interactive node to the starting interactive node based on the one or more sequences, wherein the connection comprises either one edge corresponding to a direct connection to the starting interactive node or multiple edges corresponding to an indirect connection via at least one other intermediary interactive node. The operations further comprise determining a total number of interactions represented by each of the multiple interactive nodes. The operations further comprise arranging one or more intermediate interactive nodes that are connected to the starting interactive node by an identical number of edges based on a total number of interactions of each of the one or more intermediate interactive nodes. The operations further comprise generating visualization data for the multiple interactive nodes, wherein the visualization data comprises the starting interactive node and the intermediary interactive nodes that are connected to the starting interactive node based on the one or more sequences. The operations further comprise providing the generated visualization data for display.

The disclosed subject technology further relates to a computer-implemented method for generating a flow. The method comprises receiving data for multiple interactive nodes, wherein the data defines one or more sequences of the one or more interactive nodes. The method further comprises arranging the one or more of the multiple interactive nodes based on the one or more sequences. The method further comprises assigning each of the one or more interactive nodes to coincide with one or more steps of the one or more sequences. The method further comprises determining a number of interactions represented by each of the one or more interactive nodes. For each of the one or more steps, the method further comprises organizing the one or more interactive nodes that coincide with the step to be based on the number of occurrences of the respective interactive node. The method further comprises generating visualization data for the multiple interactive nodes, wherein the visualization data comprises the one or more sequences of interactive nodes. The method further comprises providing the generated visualization data for display.

The disclosed subject technology further relates to a system for generating a flow. The system comprises one or more processors, and a machine-readable medium comprising instructions stored therein, which when executed by the processors, cause the processors to perform operations comprising receiving data for multiple interactive nodes, wherein the data defines one or more sequences of the one or more interactive nodes. The operations further comprise arranging the one or more of the multiple interactive nodes based on the one or more sequences. The operations further comprise assigning each of the one or more interactive nodes to coincide with one or more steps of the one or more sequences. The operations further comprise determining a number of interactions represented by each of the one or more interactive nodes. For each of the one or more steps, the operations further comprise organizing the one or more interactive nodes that coincide with the step to be based on the number of occurrences of the respective interactive node. The operations further comprise generating visualization data for the multiple interactive nodes, wherein the visualization data comprises the one or more sequences of interactive nodes. The operations further comprise providing the generated visualization data for display.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

FIG. 1 illustrates an example network environment for generating a flow based on multiple types of interactions.

FIG. 2A illustrates an example process for generating a flow based on multiple types of interactions.

DETAILED DESCRIPTION

Figure 2B:
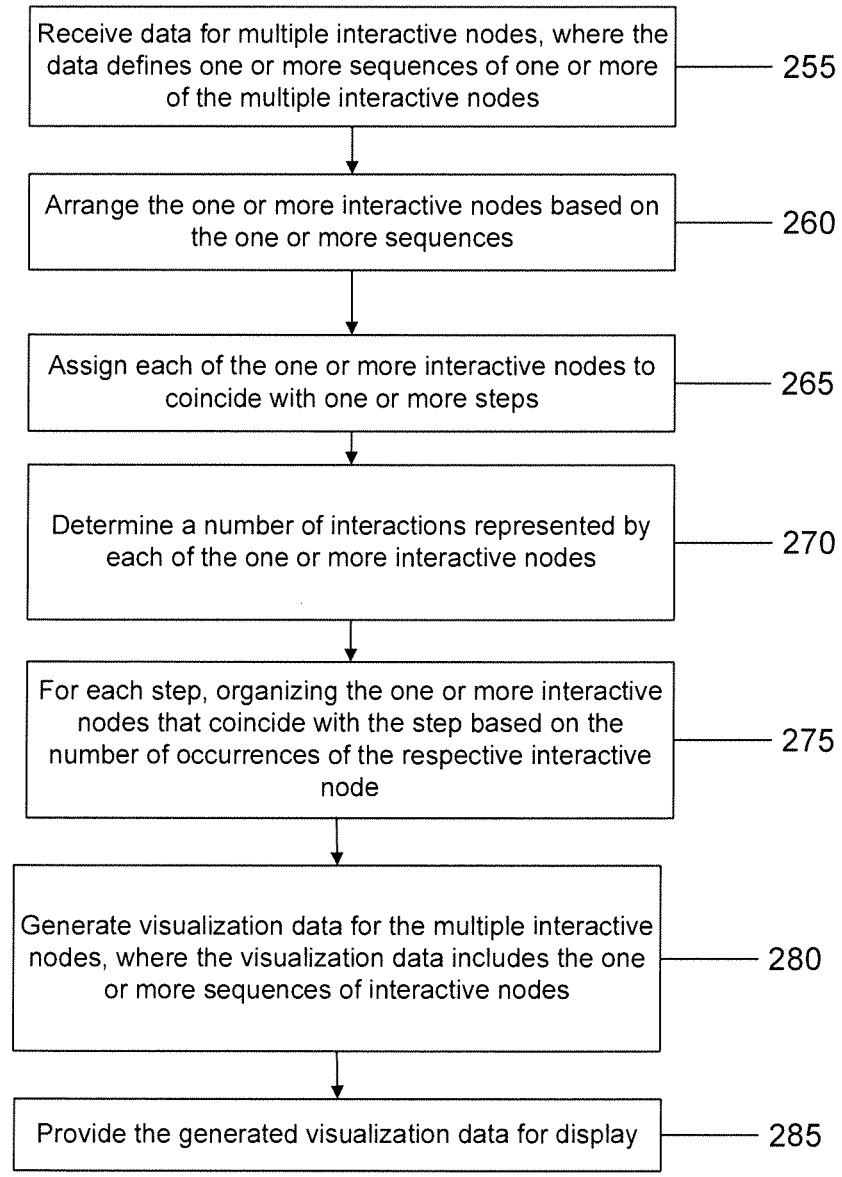
FIG. 2B illustrates an example process for generating a flow having a single type of interaction.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

In accordance with subject technology, a system and a method for generating a flow based on multiple types of interactions are provided. Interactions may include one or more user interactions (e.g., selecting a particular content, viewing a particular content, removing content, etc.) with content (e.g., a website, a video game, etc.) provided by an electronic device. Interactions may also include different ways the user can interact (e.g., type of electronic device used to view the content, type of input device used to interact with the content, etc.) with content provided by the electronic device. The interactions may be transmitted and stored in a database that is accessible to the system.

The interactions may be organized by one or more classifications. In one example, interactions that are related to one or more events (e.g., interactions related to opening an application, interactions related to modifying display size of the application, etc.) may be classified as event type interactions. Interactions that are related to one or more events may be further subdivided to types of interactions based on type of action, name, etc. In another example, interactions with respect to content displayed on a display screen may be classified as screen type interactions. Interactions with respect to content displayed on a display screen may be further subdivided to types of interactions based on type of input device used, type of electronic device the content is displayed on, size of the display, etc. An interaction may be categorized as belonging to different types. Categorization of the interactions may be performed by one or more predefined algorithms. Alternatively, the user may designate one or more parameters to categorize the interactions.

The system has access to data for multiple interactive nodes, where each of the multiple interactive nodes corresponds to a particular type of interaction. An interactive node contains an aggregate of data about one or more related interactions belonging to a particular type of interaction. An interactive node may correspond to a specific interaction. For example, the multiple of interactive nodes may include a first interactive node, which corresponds to an event type interaction, and is related to enlarging an image, and a second interactive node, which corresponds to a screen content type interaction, and is related to content displayed on a display screen at the beginning of a game. Alternatively, an interactive node may correspond to one or more related interactions. For example, the first interactive node may represent event interactions related to modifying an image, which include interactions related to enlarging the image and interactions related to reducing the image.

The system receives data for multiple interactive nodes, where the data defines one or more sequences of the interactive nodes. Upon receipt of data for the multiple interactive nodes, the system designates one of the received interactive nodes as the starting interactive node based on the one or more sequences. The starting interactive node may correspond to any of the received types of interactions. The system then designates the other interactive nodes as intermediary interactive nodes based on the one or more sequences. Each of the intermediary interactive nodes may also correspond to any of the received types of interactions. Each of the intermediary interactive nodes may include one or more interactions that occurred within a user-designated and/or a preselected timeframe. Alternatively, each of the intermediary interactive nodes may be restricted to containing only interactions that occurred within a user-designated and/or preselected timeframe. Each of the sequences of interactive nodes starts with the starting interactive node, and is followed by one or more of the intermediary interactive nodes.

The system then connects each intermediary interactive node to the starting interactive node based on the one or more sequences. Connections between the starting interactive node and the intermediary interactive nodes include either one edge, which corresponds to a direct connection to the starting interactive node, or multiple edges, which corresponds to an indirect connection via at least one other intermediary interactive node. The system may determine a total number of interactions that are represented by each interactive node. The intermediate interactive nodes that require an identical number of edges to connect to the starting interactive node are arranged based on their respective total number of interactions.

Alternatively, the system may arrange the intermediary interactive nodes into one or more steps based on the number of edges from each intermediary interactive node to the starting interactive node. In one example, the starting interactive node connects to a sequence of interactive nodes. The sequence of interactive nodes contains the starting interactive node followed by a first intermediary interactive node, which corresponds to an event type interaction, and a second intermediary interactive node, which corresponds to a screen type interaction. The first intermediary interactive node has one edge, is directly connected to the starting interactive node, and occurs one step after the starting interactive node, whereas the second intermediary interactive node has two edges, which corresponds to an indirect connection to the starting interactive node via the first intermediary interactive node, and occurs two steps after the starting interactive node.

The system may modify the one or more sequences defined by the data to exclude any interactive node that is connected to the starting node by more than a threshold number of edges. The threshold number may be user-designated or preselected. In one example, the system may set a maximum number of nodes that make up each of the one or more sequences.

The system may receive a user designation of an interactive node as the starting interactive node. The system may designate the interactive node as the user-designated starting interactive node. The system may designate other interactive nodes as intermediary interactive nodes based on the one or more sequences where the intermediary interactive nodes are further in sequence than the user-designated starting interactive node. The system may then connect each intermediary interactive node to the user-designated starting interactive node based on the one or more sequences, where the connection includes either one edge corresponding to a direct connection to the user-designated starting interactive node, or multiple edges corresponding to an indirect connection via at least one intermediary interactive node.

The system may generate visualization data for the interactive nodes. The visualization data defining the starting interactive node, the intermediary interactive nodes that are connected to the starting interactive nodes based on the one or more sequences. One or more visual representations may be used to represent the starting interactive node and the intermediary interactive nodes. In one example, the starting interactive node and the intermediary interactive nodes are each represented by a two-dimensional surface (e.g., a rectangle, a square, etc.). Dimensions of the interactive nodes may vary based on a number of interactions represented by the respective interactive node. In one example, a starting interactive node that represents 1,000 interactions may be represented by a rectangle having a dimension that is larger than the dimension of a rectangle corresponding an intermediate interactive node that represents 100 interactions.

Edges that connect successive interactive nodes of the one of more sequences may be represented by one or more visual representations. The thickness of edges may be proportional to the number of interactions represented by the first of successive interactive nodes that flows directly to the second of the successive interactive nodes. In one example, the system may provide one or more edges having greater than a preselected thickness for display. In another example, the system may receive one or more user-designated parameters (e.g., a maximum number of edges to provide for display, minimum thickness of edges that are provided for display etc.) for providing the edges for display.

The system may also provide display information for each of the interactive nodes. The display information may identify a type of interaction represented by each of the interactive nodes as well as the number of interactions represented by each of the interactive nodes. Additional display information may be provided for display in response to one or more user selections (e.g., a user toggle of a user control configured to provide additional display information). The system may provide the generated visualization data for display.

The system may also receive a user designation of one of the interactive nodes (e.g., a user selection of the interactive node), and may highlight sequences that include the user designated interactive node. The system may modify visual representation of the highlighted sequences that contain the user-designated interactive node so the highlighted sequences have a visual appearance that is different from un-highlighted sequences. In one example, visual representation of the highlight sequences may be modified to have a darker shading compared to un-highlighted sequences. In another example, visual representation of the un-highlighted sequences may be grayed out. The highlighted and un-highlighted sequences are then provided for display.

In accordance with subject technology, the system can also generate a flow for interactive nodes for a single type of interaction. In one example, the system receives data for multiple interactive nodes corresponding to a single type of interaction, where the data defines one or more sequences of the interactive nodes. In another example, the system receives data corresponding to multiple types of interactions and populate multiple interactive nodes with a single type of interaction. The system may designate the multiple interactive nodes to be populated by interactions belonging to a particular type of interaction. The user may also select interactions belonging to a particular type of interaction to populate the multiple interactive nodes.

The system arranges the one or more multiple interactive nodes based on the one or more sequences. The system also assigns the interactive nodes to coincide with one or more steps of the one or more sequences. The system determines a number of interactions represented by each of the multiple interactive nodes. Each interactive node may represent a single interaction, or one or more similar interactions that are grouped into the respective node. The system organizes the one or more interactive nodes based on the one or more sequences, where each of the one or more sequences include at least one step. For each of the one or more steps, the system organizes the one or more interactive nodes that coincide with the step to be based on the number of interactions represented by the respective interactive node. The system may modify the one or more sequences defined by the data to include a maximum threshold of interactive nodes per sequence.

The system may receive one or more user-designated interactions. In one example, system populates an interactive node with the user-designated interactions where the interactive node is designated as a starting interactive node. The system then connects other interactive nodes of the multiple interactive nodes to the starting interactive node, where the connection includes either one edge corresponding to a direct connection to the starting interactive node or multiple edges corresponding to an indirect connection via at least one other interactive node. In another example, the user-designated interactions are populated into a plurality of interactive nodes. The plurality of interactive nodes are then connected to the other interactive nodes.

The system organizes the one or more of the interactive nodes based on the one or more sequences, where each of the one or more sequences includes at least one step. For each of the one or more steps, the system may further organize the one or more interactive nodes that coincide with the step to be based on the number of occurrences of the respective interactive node. The system may designate an interactive node as a node of interest. The system may rearrange the one or more multiple interactive nodes based on one or more sequences that include the node of interest.

FIG. 1 illustrates an example distributed network environment for generating a flow based on interactive nodes. A network environment 100 includes a number of electronic devices 102, 104, and 106 communicably connected to a server 108 by a network 110. Server 108 includes a processing device 112 and a data store 114. Processing device 112 executes computer instructions stored in data store 114, for example, to generate a flow based on one or more sequences of interactions.

In some example aspects, each of the electronic devices 102, 104, or 106 may include any machine with hardware and software to run an application (e.g., a web browsing application, an electronic messaging application, a gaming application etc.) and provide an interface to display the application on an electronic device. Electronic devices 102, 104, and 106 can be mobile devices (e.g., smartphones, tablet computers, PDAs, and laptop computers), portable media players, desktop computers or other appropriate computing devices. In the example of FIG. 1, electronic device 102 is depicted as a smartphone, electronic device 104 is depicted as a desktop computer, and electronic device 106 is depicted as a tablet computer.

A user may engage in one or more interactions on each of the electronic devices 102, 104, or 106. Each electronic device 102, 104, or 106 may include one or more input devices (e.g., mouse, keyboard, touchscreen, etc.) that are configured to perform the one or more interactions. Each of the electronic devices 102, 104, or 106 may transmit data for the one or more performed interactions to server 108 via network 110.

Server 108 may be any system or device having a processor, memory, and communications capability for generating a flow based on multiple types of interactions. Server 108 may be a single computing device such as a computer server. Server 108 may also represent more than one computing device working together to perform the actions of a server computer.

Server 108 includes a processing device 112 and a data store 114. Processing device 112 executes computer instructions stored in a computer-readable medium, for example, to generate a flow based on multiple types of interactions and to provide visualization data for the generated flow to electronic device 102, 104, or 106. Data store 114, contains instructions for generating a flow based on multiple types of interactions. Data store may also contain visualization data for the generated flow, which may be transmitted to the electronic device 102, 104, or 106.

Server 108 receives data for multiple interactive nodes, each interactive node corresponding to a particular type of interaction, wherein the data defines one or more sequences of the interactive nodes. The data may be transmitted from electronic device 102, 104, or 106 to server 108 via the network 110. Based on the received data, Server 108 designates one interactive node based on the one or more sequences and other interactive nodes as intermediary interactive nodes based on the one or more sequences, where the intermediary interactive nodes are further in sequence from the starting interactive node, and where the starting interactive node and at least one of the intermediary interactive nodes correspond to different types of interactions.

Server 108 connects each intermediary interactive nodes to the starting interactive node based on the one or more sequences, wherein the connection includes either one edge corresponding to a direct connection to the starting interactive node or multiple edges corresponding to an indirect connection via at least one other intermediary interactive node. Server 108 may determine a total number of interactions represented by each interactive node. Upon a determination of the total number of interactions represented by each of the respective interactive nodes, server 108 arranges interactive nodes that are connected to the starting interactive node by an identical number of edges based on their respective total number of interactions.

Server 108 may generate visualization data for the interactive nodes. The visualization data defining the starting interactive node and the intermediary interactive nodes that are connected to the starting interactive nodes are based on the one or more sequences. Upon generation of the visualization data, server 108 may provide the generated visualization data for display on electronic device 102, 104, or 106 via the network 110.

Server 108 may also receive data for interactive nodes that correspond to a single type of interaction, where the data defines one or more sequences of the interactive nodes. Server 108 receives data for multiple interactive nodes, where the data defines one or more sequences of the one or more interactive nodes. Server 108 arranges the one or more multiple interactive nodes based on the one or more sequences. Server 108 assigns each of the one or more interactive nodes to coincide with one or more steps of the one or more sequences. Server 108 determines a number of interactions represented by each of the one or more interactive nodes. For each of the one or more steps, server 108 organizes the one or more interactive nodes that coincide with the step based on the number of occurrences of the respective interactive node. Server 108 may generate a visualization data based on the one or more sequences and provide the visualization data for display to electronic device 102, 104, or 106 via network 110.

Network 110 can include, for example, any one or more of a cellular network, a satellite network, a personal area network (PAN), a local area network (LAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

FIG. 2A illustrates an example process for generating a flow based on multiple types of interactions. Although the operations in process 200 are shown in a particular order, certain operations may be performed in different orders or at the same time. The process is initiated when server 108 accesses data for multiple interactive nodes. In one example, the data is stored in a database that is accessible to server 108. In block 205, server 108 receives data for multiple interactive nodes, where each of the multiple interactive nodes corresponds to a particular type of interaction.

Interactions may include one or more user interactions (e.g., selecting a particular content, viewing a particular content, removing content, etc.) with content (e.g., a website, a video game, etc.) provided by an electronic device. Interactions may also include different ways the user can interact (e.g., type of electronic device used to view the content, type of input device used to interact with the content, etc.) with content provided by the electronic device. The interactions may be organized by one or more classifications. In one example, interactions that are related to one or more events (e.g., interactions related to opening an application, interactions related to modifying display size of the application, etc.) may be classified as event type interactions. Interactions that are related to one or more events may be further subdivided to types of interactions based on type of action, name, etc. In another example, interactions with respect to content displayed on a display screen may be classified as screen type interactions. Interactions with respect to content displayed on a display screen may be further subdivided to types of interactions based on type of input device used, type of electronic device the content is displayed on, size of the display, etc. An interaction may be categorized as belonging to different types of interactions. Categorization of the interactions may be performed by one or more predefined algorithms. Alternatively parameters for categorizing the interactions may be designated by the user.

Each interactive node may include one or more related interactions belonging to a particular type of interaction. For example, an interactive node corresponding to an event type interaction may include interactions related to opening a web application and interactions related to closing the web application. One or more algorithms may determine how one or more interactions are grouped into a single interactive node. Alternatively, the user may designate parameters for grouping one or more interactions into a single node. In one example, the user may elect to group all interactions related to moving a cursor into one interactive node regardless of the direction of the cursor's movement.

Each interactive node may include all previous interactions assigned to the respective interactive node. Alternatively, each interactive node may include one or more interactions that occurred within a predetermined timeframe. Alternatively, each interactive node may include one or more interactions that occurred within a user-designated timeframe.

The received data also defines one or more sequences of the interactive nodes. Interactions grouped within a sequence of interactive nodes occur in a sequential order. For example, in a sequence of interactive nodes that includes a first event type interactive node, which is followed by a screen type interactive node, which is followed by a second event type interactive node, one or more interactions belonging to the first event type interactive node, the screen type interactive node and the second event type interactive node occur in a sequential order. In this case, one or more interactions belonging to the first event type interactive nodes occurs followed by one or more interactions belonging to the screen type interaction followed by one or more interactions belonging to the second event type interactive node.

In block 210, one of the multiple interactive nodes is designated as the starting interactive node based on the one or more sequences. The starting interactive node is the interactive node that commences the one or more sequences. A total number of times that the starting interaction has occurred may be determined.

In block 215, other interactive nodes are designated as intermediary interactive nodes based on the one or more sequences, where the intermediary interactive nodes are further in sequence from the starting interactive node. For each of the one or more sequences, a determination of an end interactive node, where the end interactive node corresponds to a last interactive node for the respective sequence can be made. A determination of a total number of interactions represented by the end interactive node can also be made. While the one or more sequences each begin with the starting interactive node, the one or more sequences may end with different interactive nodes end interactive nodes. A total number of interactions represented by each respective end interactive nodes may be determined.

In block 220, each of the intermediary interactive nodes is connected to the starting interactive node based on the one or more sequences, where the connection includes either a single edge corresponding to a direct connection to the starting interactive node or multiple edges corresponding to an indirection connection via at least one other intermediary interactive node. The number of edges needed to connect a intermediary interactive node to the starting interactive node represents the number of sequential steps traversed starting from the starting interactive node to reach the intermediary interactive node. Server 108 may also determine a total number of interactions represented by each interactive node and arrange the one or more intermediary interactive nodes having identical number of edges based on their respective total number of interactions.

The one or more sequences may be modified to exclude any interactive node that is connected to the starting node by more than a threshold number of edges. In one example, the threshold number is user-designated. In another example, the threshold number is preselected.

The user may designate an interactive node as a user-designated interactive node. Server 108 would then designate the interactive node as a user-designated starting interactive node, and designate other interactive nodes as intermediary interactive nodes based on the one or more sequences, where the intermediary interactive nodes are further in sequence from the user-designated starting interactive node. Each intermediary interactive node would then be connected to the user-designated starting interactive nodes based on the one or more sequences, where the connection includes either one edge corresponding to a direct connection to the user-designated starting interactive node, or multiple edges corresponding to an indirect connection via at least one other intermediary interactive node.

In block 225, visualization data for the interactive nodes including the starting interactive node and the intermediary interactive nodes that are connected to the starting interactive node based on the one or more sequences may be generated. One or more visual elements may be used to represent the starting interactive node, the intermediary interactive nodes and one or more edges between each intermediary interactive node and the starting interactive node. In one example, each of the interactive nodes may be represented by a surface, where dimensions of the surface are proportional to a number of interactions represented by a corresponding interactive node.

The thickness of edges that connect the interactive nodes may be uniform. Alternatively, the thickness of edges that connect successive interactive nodes of the one or more sequences are proportional to a number of interactions represented by the first of the successive interactive nodes that cause one or more interactions represented by the second of the successive interactive nodes. In one example, only edges having a thickness that is greater than a preselected threshold are provided for display. In another example, one or more user-designated parameters may determine the number of edges that are provided for display. For example, the user may designate to display all edges regardless of thickness. Upon receipt of user-designated parameters, the system provides edges for display based on the user-designated parameters. For each of the interactive nodes, display information that identifies a type of interaction represented by the interactive node may be provided. The display information may also include a number of interactions represented by the interactive node.

The system may receive a user designation of one or more interactive nodes and may highlight one or more sequences including the user-designated interactive node that are provided by the visualization data. Visual appearance of the highlighted one or more sequences may be different from visual appearance of the one or more un-highlighted sequences provided by the visualization data. The system may determine a number of interactions represented by each of the highlighted interactive nodes. For each highlighted interactive node that precedes the user-designated interactive node, the system may determine a number of interactions represented by the preceding interactive node that causes (either directly or indirectly) an interaction represented by the user-designated interactive node.

In block 230, the generated visualization data is provided for display. The system may provide for display, a ratio of the determined number of interactions represented by the preceding interactive node that causes an interaction represented by the user-designated interactive node and a total number of interactions represented by the preceding interactive node. For each highlighted interactive node that follows the user-designated interactive node, the system may determine a number of interactions represented by the subsequent interactive node that results from (either directly or indirectly) an interaction represented by a user-designated interactive node. The system may provide for display a ratio of the determined number of interactions represented by the subsequent interactive node that results from an interaction represented by the user-designated interactive node and the total number of interactions represented by the subsequent interactive node. The system may also provide for display a total number of interactions represented by the user-designated interactive node.

FIG. 2B illustrates an example process for generating a flow having a single type of interaction. Although the operations in process 250 are shown in a particular order, certain operations may be performed in different orders or at the same time. The type of interaction may be preselected. Alternatively, the type of interaction may also be user-designated. Examples of user-designated interactions include, but are not limited to, event type interactions, screen type interactions and other types of interactions discussed throughout the specification.

In block 255, server 108 receives data for multiple interactive nodes, where the data defines one or more sequences of the one or more interactive nodes. Each of the one or more interactive nodes may contain a group of similar interactions. In one example, each of the one or more interactive nodes may include interactions that occurred within a user-designated timeframe. In another example, each of the one or more interactive nodes may be restricted to interactions that occurred within a user-designated timeframe.

In block 260, server 108 arranges the one or more interactive nodes based on one or more sequences. Server 108 may modify the one or more sequences defined by the data to limit length of the one or more sequences. In one example, server 108 may restrict the one or more sequences to have less than a threshold number of interactive nodes per sequence. The threshold number of interactive nodes per sequence may be preselected or user-designated.

In block 265, server 108 assigns each of the one or more interactive nodes to coincide with one or more steps to identify progression of the sequences. In block 270, server 108 determines a number of interactions represented by each of the one or more interactive nodes. In block 275, for each of the one or more steps, server 108 organizes the one or more interactive nodes that coincide with the step to be based on the number of occurrences of the respective interactive node.

Server 108 may receive a user designation of an interactive node as a node of interest. Server 108 may designate the user-designated interactive node as a node of interest. Server 108 may arrange the one or more interactive nodes based on one or more sequences that include the node of interest.

In block 280, Server 108 generates visualization data for the one or more interactive nodes. The visualization data may include the one or more interactive nodes based on the one or more sequences. For each of the one or more interactive nodes, the visualization data may include a total number of interactions represented by the respective interactive node. In block 285, server 108 provides the generated visualization data for display.

Figure 3A:
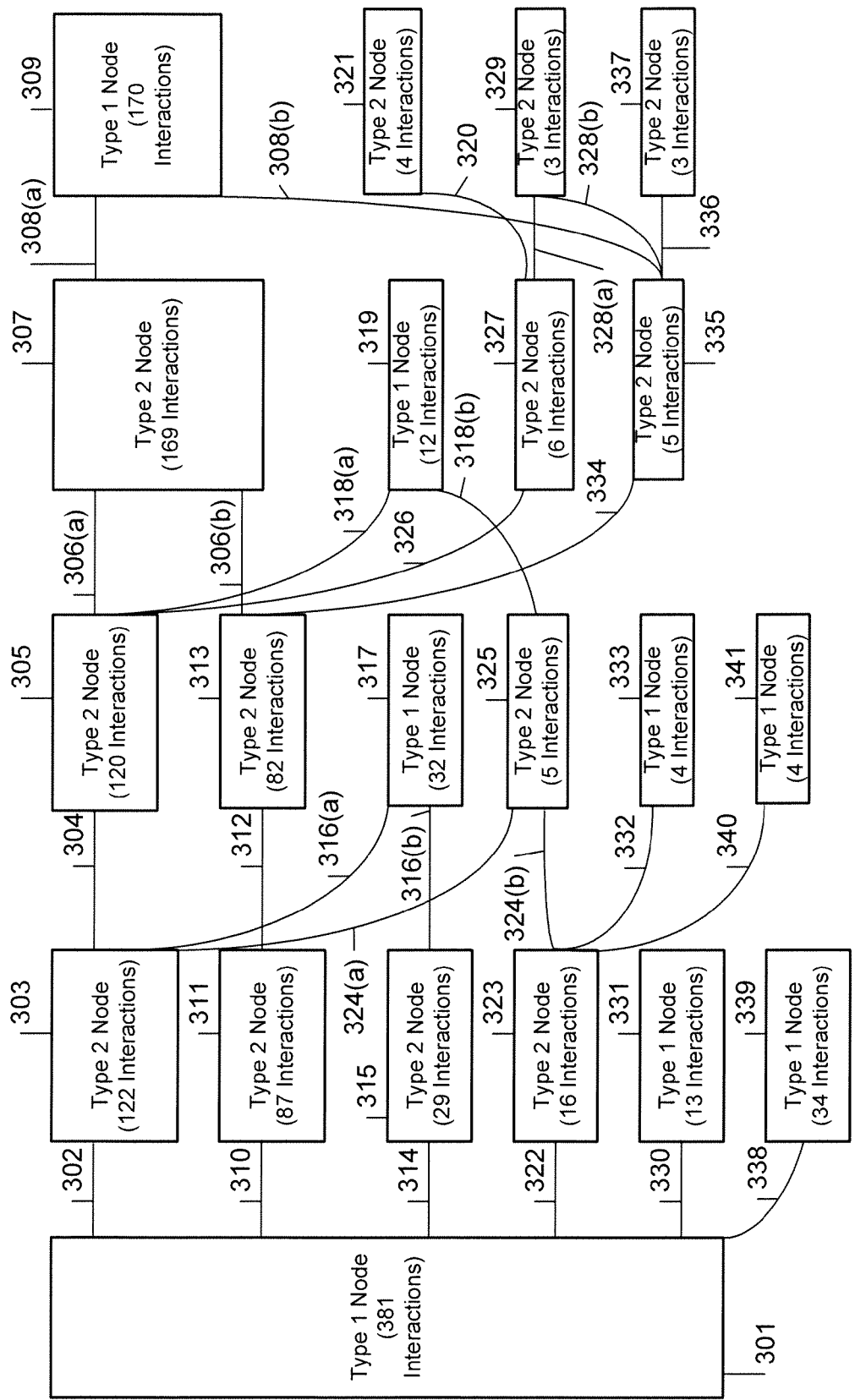
FIG. 3A is an example illustration of a flow having multiple types of interactions.

FIG. 3A is an example illustration of a flow having multiple types of interactions. As shown in FIG. 3A, block 301 represents starting interactive node. As shown in FIG. 3A, the starting interactive node 301 is connected to intermediate interactive nodes 303, 305, 307, 309, 311, 313, 315, 317, 319, 321, 323, 325, 327, 329, 331, 333, 335, 337, 339, and 341 via one or more edges 302, 304, 306(a), 306(b), 308(a), 308(b), 310, 312, 314, 316(a), 316(b), 318(a), 318(b), 320, 322, 324(a), 324(b), 326, 328(a), 328(b), 330, 332, 334, 336, 338, and 340. FIG. 3A depicts interactive nodes 301, 303, 305, 307, 309, 311, 313, 315, 317, 319, 321, 323, 325, 327, 329, 331, 333, 335, 337, 339, and 341 as blocks. In one example, dimensions of blocks that represent the interactive nodes shown in FIG. 3A may vary based on the number of interactions that are represented by the corresponding interactive nodes. For example, the block for interactive node 301, which represents 381 interactions, is depicted as having a larger dimension compared to the block for interactive node 303, which represents 122 interactions. Additional visual representations may be used to depict the interactive nodes.

FIG. 3A depicts edges 302, 304, 306, 308, 310, 312, 314, 316, 318, 320, 322, 324, 326, 328, 330, 332, 334, 336, 338, and 340 as lines. Additional visual representations may be used to depict the edges. As shown in FIG. 3A, the edges have identical thickness. Alternatively thickness of an edge that connects successive interactive nodes may be proportional to a number of interactions represented by the first of the successive interactive nodes that cause one or more interactions represented by the second of the successive interactive nodes.

As shown in FIG. 3A, starting interactive node 301 and intermediary interactive nodes 303, 305, 307, and 309 form a first sequence of interactions that are connected by edges 302, 304, 306(a), and 308(a) respectively. As shown in FIG. 3A, starting interactive node 301 and intermediary interactive nodes 311, 313, 307, and 309 form a second sequence of interactions that are connected by edges 310, 312, 306(b), and 308(a) respectively. As shown in FIG. 3A, starting interactive node 301 and intermediary interactive nodes 303, and 317 form a third sequence of interactive nodes that are connected by edges 302 and 316(a). As shown in FIG. 3A, starting interactive node 301 and intermediary interactive nodes 303, 325 and 319 form a fourth sequence of interactive nodes that are connected by edges 302, 324(a), and 318(b). FIG. 3A contains additional sequences of interactive nodes beginning with starting interactive node 301 and ending with one of the intermediary interactive nodes 303, 305, 307, 309, 311, 313, 315, 317, 319, 321, 323, 325, 327, 329, 331, 333, 335, 337, 339, or 341, where the additional sequences are connected by one or more edges 302, 304, 306(a), 306(b), 308(a), 308(b), 310, 312, 314, 316(a), 316(b), 318(a), 318(b), 320, 322, 324(a), 324(b), 326, 328(a), 328(b), 330, 332, 334, 336, 338, and 340.

Display information for each of the interactive nodes may be provided. In one example, the display information for an interactive node may identify a type of interaction that corresponds to interactions represented by the interactive node. As shown in FIG. 3A, starting interactive node 301 and intermediary interactive nodes 309, 317, 319, 331, 333, 339, and 341 are categorized as a type 1 interactive node, and intermediary interactive nodes 303, 305, 307, 311, 313, 315, 321, 323, 325, 327, 329, 335, and 337 are categorized as a type 2 interactive node. In one example, type 1 interactive nodes represent screen type interactions and type 2 interactive nodes represent event type interactions. The interactive nodes are not limited to having two types of interactions, and may represent additional types of preselected, or user-designated interactions. For example, interactive node 301 may represent type 1 interactions, interactive node 303 may represent type 2 interactions, interactive node 305 may represent type 3 interactions, interactive node 305 may represent type 4 interactions, etc. Furthermore, starting interactive node 301 and intermediary interactive nodes 309, 317, 319, 331, 333, 339, and 341 each can represent one or more related type one interactions. Intermediary interactive nodes 303, 305, 307, 311, 313, 315, 321, 323, 325, 327, 329, 335, and 337 each can represent one or more related type two interactions.

In another example, display information for an interactive node may also include a total number of interactions that are represented by the interactive node. As shown in FIG. 3A, starting interactive node 301, which is the first interactive node in all of the sequences of interactions shown in FIG. 3A contains a total of 381 interactions. The first sequence of interactions then proceeds to intermediary interactive node 303, which contains 122 type 2 interactions, followed by intermediary interactive node 305, which contains 120 type 2 interactions, followed by intermediary interactive node 307, which contains 169 type 2 interactions, and ending with intermediary interactive node 309 which contains 170 type 1 interactions. Additional interactive nodes as shown in FIG. 3A contains different numbers of interactions.

As shown in FIG. 3A, intermediary interactive nodes 303, 311, 315, 323, 331, and 339 are each connected to starting interactive node 301 via one edge, and intermediary interactive nodes 305, 313, 317, 325, 333, and 341 are each connected to starting node via two edges. Intermediary interactive nodes that are connected to the starting interactive node via identical number of edges may be arranged by their respective total number of interactions. As shown in FIG. 3A, intermediary interactive nodes 303, 311, 315, 323, 331, and 339 are arranged from top to bottom starting with intermediate interactive node 303, which has the most number of interactions out of the intermediary interactive nodes 303, 311, 315, 323, 331, and 339 that require one edge to connect to the starting interactive node 301 followed by intermediary interactive node 311, which has the second most number of interactions out of the intermediary interactive nodes 303, 311, 315, 323, 331, and 339 that require one edge to connect to the starting interactive node. The one or more sequences may be modified to exclude any interactive node that is connected to the starting node by more than a threshold number of edges. The threshold number may be user-designated or preselected. As shown in FIG. 3A, none of the sequences are longer contains more than five interactive nodes per sequence. Any interactive node that is connected to the starting interactive node via five or more edges are excluded from any of the sequences and are not provided for display.

Figure 3B:
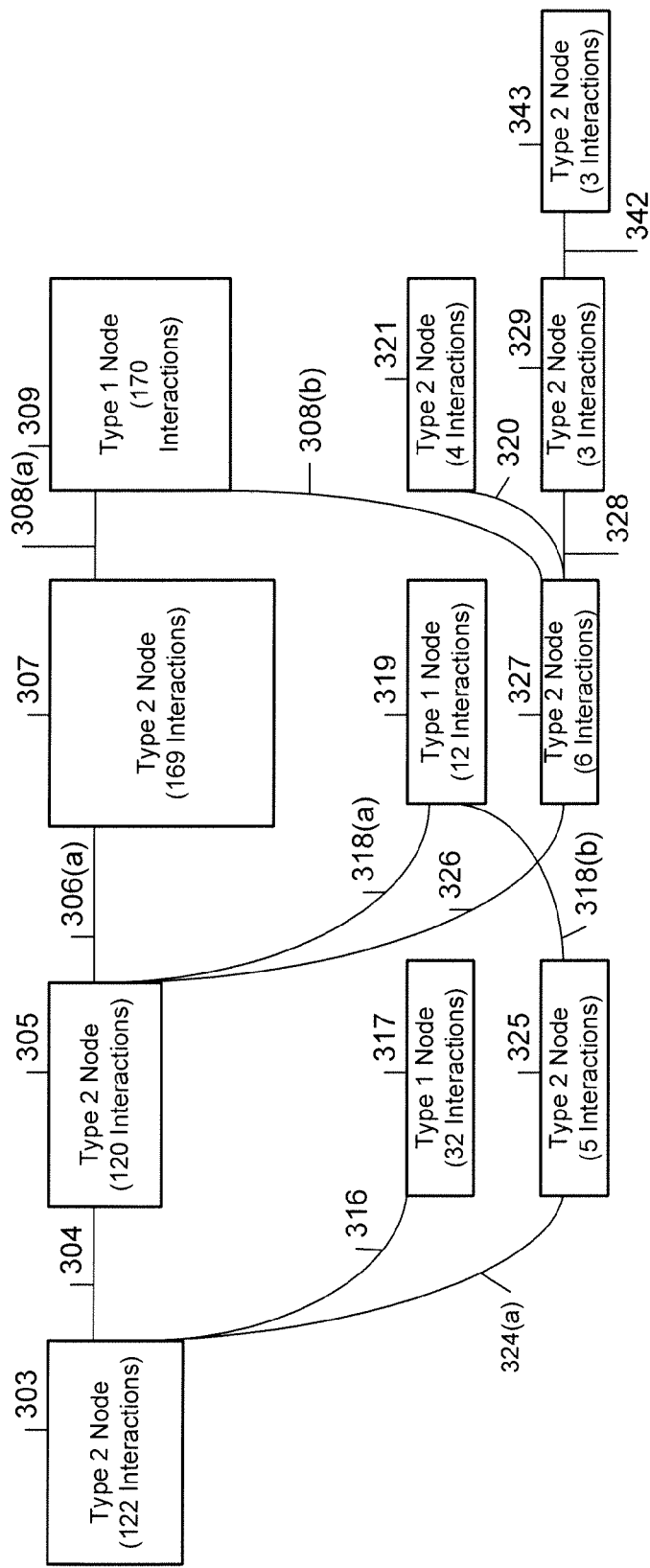
FIG. 3B is an example illustration of the flow of FIG. 3A, where one of the interactive nodes is designated as a user-designated starting interactive node.

FIG. 3B is an example illustration of the flow of FIG. 3A, where one of the interactive nodes is designated as a user-designated starting interactive node. As shown in FIG. 3B, intermediate interactive node 303 of FIG. 3A has been designated as the starting interactive node. Other interactive nodes 305, 307, 309, 317, 319, 321, 325, 327, and 329 that form one or more sequences of interactive nodes that begins with intermediate interactive node 303 are designated as intermediary interactive nodes. The intermediate interactive nodes 305, 307, 309, 317, 319, 321, 325, 327, and 329 are connected to the user-designated starting interactive node 303 via one or more edges 304, 306(a), 308(a), 308(b), 316, 318(a), 318(b), 320, 324(a), 326, and 328 in response to interactive node 303 being designated as the starting interactive node.

The one or more sequences may be modified to exclude any interactive node that is connected to the starting node by more than a threshold number of edges. As shown in FIG. 3A, the one or more sequences each contains a maximum of five interactive nodes starting from starting interactive node 301. In one example, the sequences shown in FIG. 3A have been modified to exclude any interactive node that is connected to starting interactive node 301 by more than four edges. This threshold may be user-designated or preselected.

The one or more sequences shown in FIG. 3B also exclude any interactive node that is connected to the starting interactive node by more than four edges. However, since intermediary interactive node 303 has been designated as the starting interactive node, the sequence shown in FIG. 3B may include additional intermediary interactive nodes not displayed in FIG. 3A. As shown in FIG. 3B, interactive node 343 is connected indirectly to user-designated starting interactive node 303 via interactive nodes 305, 327, 329, and 343. The sequences shown in FIG. 3A do not contain interactive node 343 because interactive node 343 needs five edges to connect to starting interactive node 301 and the one or more sequences shown in FIG. 3A are modified to exclude interactive nodes that are connected to starting interactive node 301 by five or more edges. However, since interactive node 343 requires four edges to connect to user-designated interactive node 303, it is included in one of the sequences of interactive nodes shown in FIG. 3B.

Figure 3C:
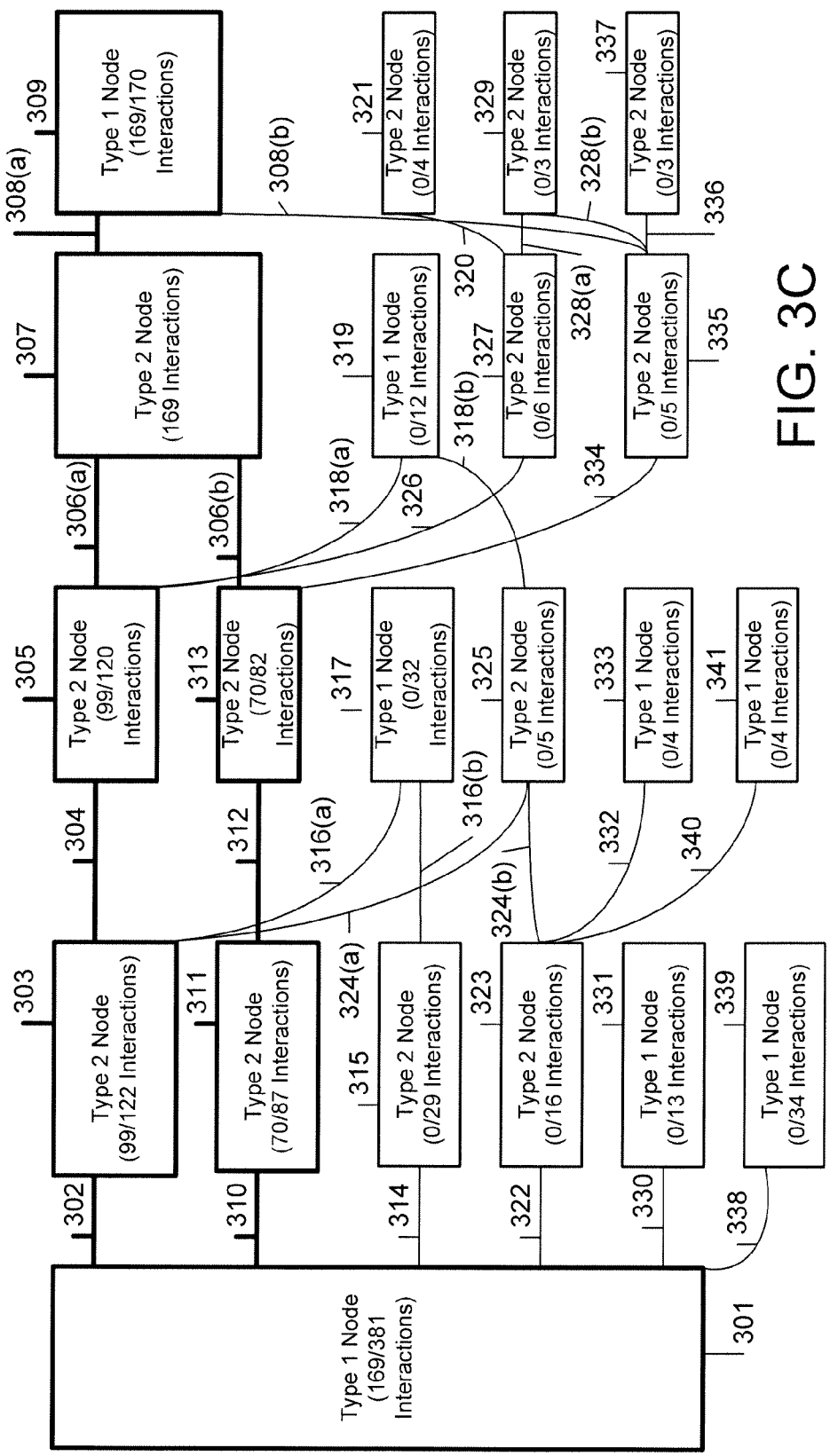
FIG. 3C is an example illustration of the flow of FIG. 3A, where sequences that include a user-designated node are highlighted.

FIG. 3C is an example illustration of the flow of FIG. 3A, where sequences that include a user-designated node 307 are highlighted. As shown in FIG. 3A, two sequences that include user-designated interactive node 307 are highlighted. The visual appearance of a first highlighted sequence of interactive nodes 301, 303, 305, 307, and 309 and a second highlighted sequence of interactive nodes 301, 311, 313, 307 and 309 are different than the un-highlighted sequences shown in FIG. 3C. As shown in FIG. 3C, surfaces that represent highlighted interactive nodes and edges that connect the highlighted interactive nodes contain thicker borders compared to un-highlighted interactive nodes, and edges that do not connect two highlighted interactive nodes. In another example, surfaces that represent highlighted interactive nodes and edges that connect highlighted interactive nodes may be provided in a different color than surfaces of un-highlighted interactive nodes and edges that do not connect highlighted interactive nodes. In another example, the visualization data may be modified to provide only highlighted sequences for display.

For each of the highlighted interactive nodes that precedes the user-designated interactive node in the one or more sequences, a ratio of interactions represented by the corresponding interactive node that causes an interaction represented by the user-designated interactive node and a total number of the interactions represented by the preceding interactive node may be provided. As shown in FIG. 3C, 169 interactions out of the 381 interactions represented by starting interactive node 301 indirectly cause one or more interactions represented by user-selected node 307. Furthermore, for each of the highlighted interactive nodes that follows the user-designated interactive node in the one or more sequences, a ratio of interactions represented by the corresponding interactive node that results from an interaction represented by the user-designated interactive node and the total number of interactions represented by the subsequent interactive node may also be provided. As shown in FIG. 3C, 169 out of 170 interactions represented by interactive node 309 are caused by one or more interactions represented by user-designated interactive node 307.

As shown in FIG. 3C, interactive nodes 315, 317, 319, 321, 323, 325, 327, 329, 331, 333, 335, 337, 339 and 341 are not highlighted because none of the interactions represented by these interactive nodes cause or result from an interaction that is represented by the user-designated interactive node. For each of the un-highlighted interactive nodes, a ratio of the number of interactions represented by the un-highlighted interactive node that causes or results from an interaction that is represented by the user-designated interactive node to the total number of interactions represented by the un-highlighted interactive node is also provided in FIG. 3C. As shown in FIG. 3C, 0 out of 29 interactions represented by un-highlighted interactive node 315 cause or result in one or more interactions represented by user-designated interactive node 307.

Figure 4A:
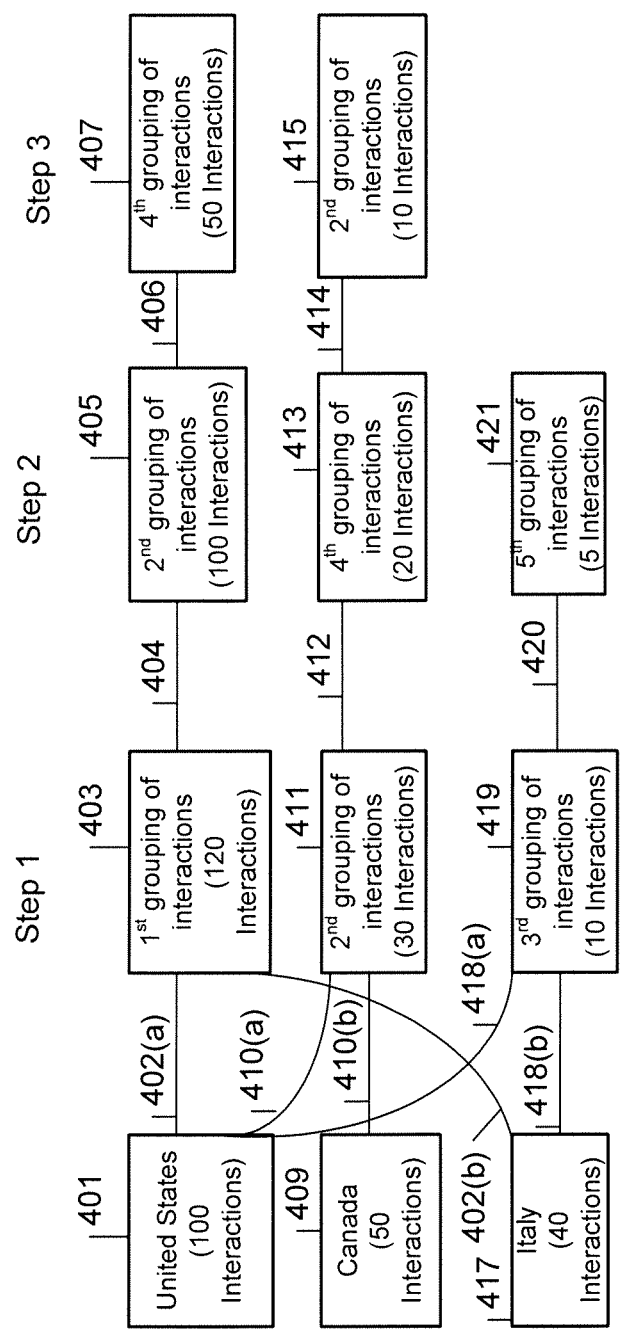
FIG. 4A is an example illustration of a flow having a single type of interaction.

FIG. 4A is an example illustration of a flow having a single type of interaction. As shown in FIG. 4A, blocks 401, 403, 405, 407, 409, 411, 413, 415, 417, 419, and 421 represent interactive nodes. Additional visual representations may be used to depict the interactive nodes. Interactive nodes 401, 409, and 417 represent countries where the interactions originated from. Interactive nodes 403, 405, 407, 411, 413, 415, 419, and 421 represent different interactions. As shown in FIG. 4A, the interactive nodes are designated by one or more steps.

As shown in FIG. 4A, multiple sequences of interactions based on interactive nodes 401, 403, 405, 407, 409, 411, 413, 415, 417, 419, and 421 are formed and are connected by edges 402(*a*), 402(*b*), 404, 406, 410(*a*), 410(*b*), 412, 414, 418(*a*), 418(*b*), and 420. In one example, a first sequence of interactions includes interactive nodes 401, 403, 405 and 407, which are connected by edges 402(*a*), 404, and 406. As shown in FIG. 4A, the edges have identical thickness. Alternatively, the thickness of an edge that connects successive interactive nodes may be proportional to the number of interactions represented by a subsequent of the successive interactive nodes that occurs as a result of one or more interactions represented by a previous of the successive interactive nodes.

Each of the interactive nodes 401, 403, 405, 407, 409, 411, 413, 415, 417, 419, or 421 may represent one or more interactions. For example, first interaction 403 may represent a single interaction or a group of related interactions. As shown in FIG. 4A, interactive node 403 represents a 1st grouping of interactions, interactive node 405 represents a 2nd grouping of interactions, interactive node 419 represents a third grouping of interactions, interactive node 407 represents a 4th grouping of interactions, interactive node 421 represents a 5th grouping of interactions, etc. Each grouping of interactions may represent one or more related interactions. Multiple interactive nodes may contain interactions belonging to a particular grouping of interactions (e.g., both interactive nodes 411 and 415 contain interactions belonging to a 2nd grouping of interactions). Each of the interactive nodes, 401, 403, 405, 407, 409, 411, 413, 415, 417, 419, or 421 includes a total number of interactions represented by respective interactive node. Display information containing the total number of interactions for each of the interactive nodes may be provided. The total number of interactions may represent interactions that occurred within a preselected and/or a user-designated timeframe. The length of the one or more sequences may be modified to be less than a threshold number of interactive nodes per sequence. The threshold number may be predetermined or user-selected.

Figure 4B:
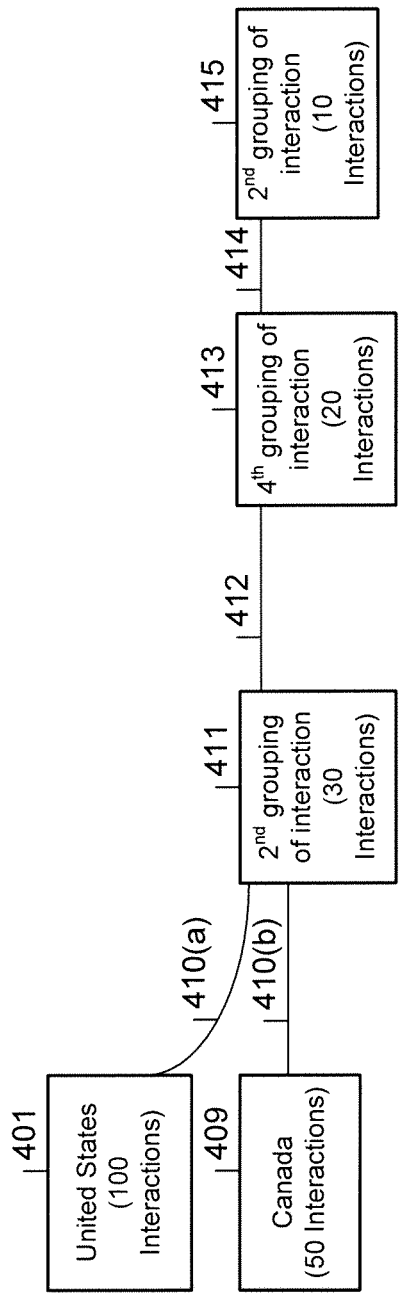
FIG. 4B is a first example illustration of the flow of FIG. 4A, where one of the interactive nodes is designated as a node of interest.

FIG. 4B is a first example illustration of the flow of FIG. 4A, where interactive node 411 is designated as a node of interest. As shown in FIG. 4B, two the sequences that include interactive node 411 are generated in response to a user designation of interactive node 411 as the node of interest. As shown in FIG. 4B, interactive node 401 represents interactions that originated from the United states and interactive node 409 represents interactions that originated from Canada. As shown in FIG. 4B, the first sequence begins with interactive node 401, and progresses through interactive nodes 411, 413, and 415. The second sequence begins with interactive node 409, and progresses through interactive nodes 411, 413, and 415. One or more difference sequences may be generated in response to a user selection of another interactive node (e.g., 401, 411, 413, or 415).

Figure 4C:
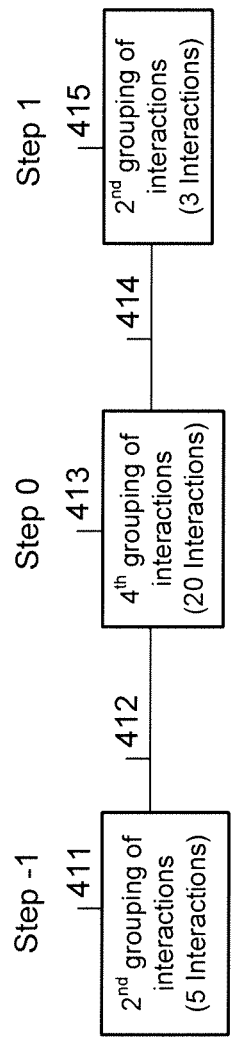
FIG. 4C is a second example illustration of the flow of FIG. 4A, where one of the interactive nodes is designated as a node of interest.

FIG. 4C is a second example illustration of the flow of FIG. 4A, where interactive node 413 is designated as a node of interest. Interactive node 413 is designated as the node of interest, and is connected to interactive node 411, which contains one or more interactions that cause one or more interactions represented by interactive node 413. Interactive node 413 is also connected to interactive node 415, which contains one or more interactions that occur as a result of one or more interactions represented by interactive node 413. Additional interactive nodes that precede interactive node 411 in the one or more sequences, or follow interactive node 415 in the one or more sequences may also be generated and may be provided for display. The number of interactive nodes preceding and/or following the node of interest that are provided for display may be predetermined or user-selected.

As shown in FIG. 4C, node of interest 413 is designated to coincide with step 0. Interactive node 411, which represents one or more interactions that cause one or more interactions represented by node of interest 413, is designated to coincide with step −1. Interactive node 415, which represents one or more interactions that occur as a result of one or more interactions represented by node of interest 413 is designated to coincide with step 1. Additional interactive nodes that precede the node of interest are designated to coincide with steps in a decreasing order (e.g., step −1, step −2, step −3, etc.) based on the number of edges needed to connect to the node of interest. Additional interactive nodes that follow the node of interest are designated to coincide with steps in an increasing order (e.g., step 1, step 2, step 3, etc.) based on the number of edges needed to connect to the node of interest.

Figure 5:
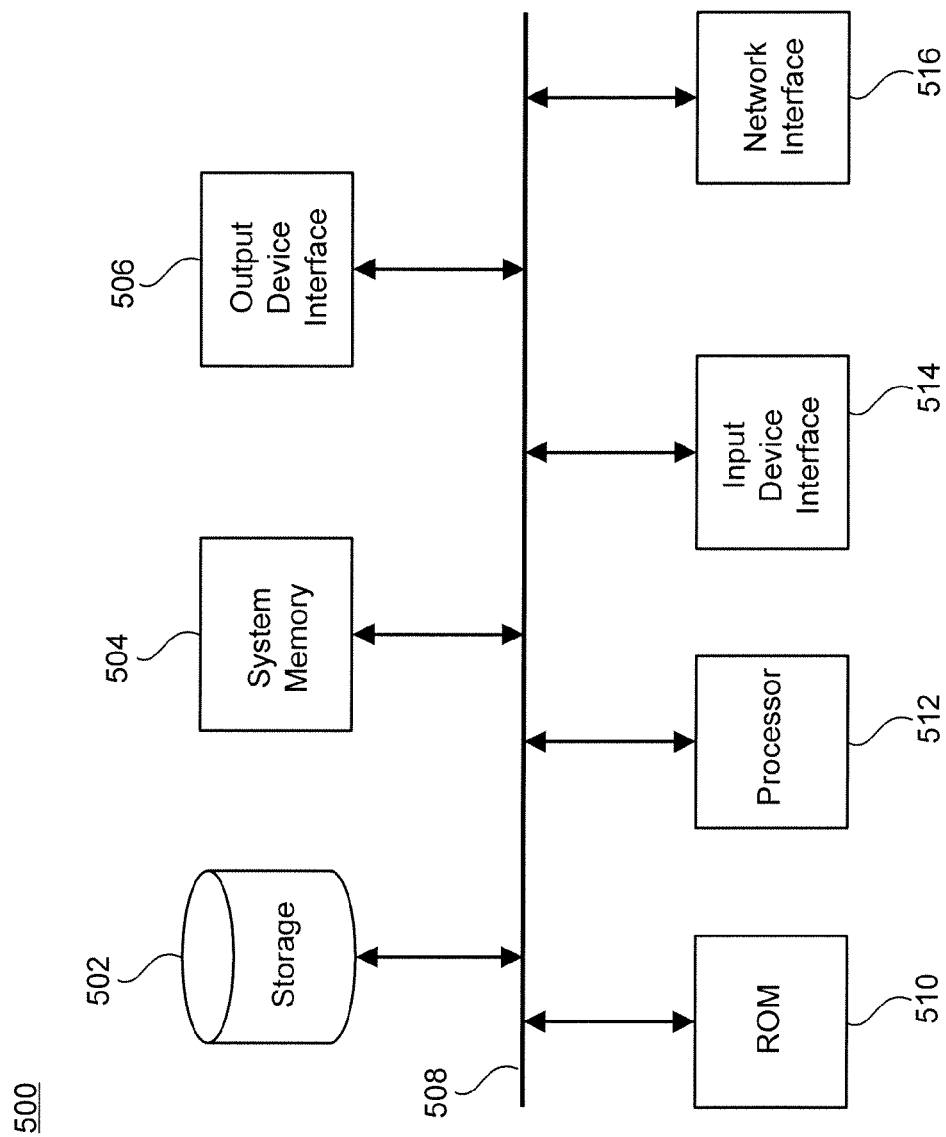
FIG. 5 conceptually illustrates an electronic system with which some implementations of the subject technology are implemented.

Display information may be provided for each interactive node. A total number of interactions represented by the node of interest is provided. As shown in FIG. 4C, 20 interactions are represented by node of interest 413. A number of interactions represented by an interactive node that precedes the node of interest, where the interactions cause (directly/indirectly) one or more interactions represented by the node of interest may be provide. As shown in FIG. 4C, 5 interactions represented by interactive node 411 cause one or more interactions represented by node of interest 413. A number of interactions represented by an interactive node following the node of interest, where the interactions occur (directly/indirectly) as a result of one or more interactions represented by the node of interest may also be provided. As shown in FIG. 4C, 3 interactions represented by interactive node 415 occur as a result of one or more interactions represented by node of interest 413. Display information may provide additional relevant information related to the node of interest.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

FIG. 5 conceptually illustrates an electronic system with which some implementations of the subject technology are implemented. Electronic system 500 can be a laptop computer, a desktop computer, smartphone, PDA, a tablet computer or any other sort of device 102, 104, and 106. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, and/or ROM 510. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through a network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's electronic device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to an electronic device (e.g., for purposes of displaying data to and receiving user input from a user interacting with the electronic device). Data generated at the electronic device (e.g., a result of the user interaction) can be received from the electronic device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

Nothing disclosed herein is intended to be dedicated to the public regardless of whether such disclosure is explicitly recited in the claims.

What is claimed is:

1. A computer-implemented method for generating a flow based on multiple types of interactions, the method comprising:
   receiving data defining a plurality of sequences of nodes, a first node of a sequence of nodes associated with an event type interaction indicative of a user interaction action associated with an application provided on a device, a second node of the sequence of nodes associated with a screen type interaction indicative of content displayed on a display screen of the device;
   designating a node as a starting node, each sequence of nodes including the node designated as the starting node;
   designating remaining nodes of each sequence of nodes of the plurality of sequences of nodes as intermediary nodes, wherein the intermediary nodes are in sequence from the starting node;
   connecting each intermediary node to the starting node, wherein each connection of an intermediary node to the starting node comprises either an edge corresponding to a direct connection to the starting node or a series of edges corresponding to an indirect connection via at least one other intermediary node;
   generating visualization data for the plurality of sequences of nodes, wherein the visualization data comprises data to effect display of the starting node and the intermediary nodes that are connected to the starting node including the first node and the second node, wherein the generated visualization data for each node of the plurality of sequences of nodes includes data to effect display of each node as a surface having dimensions proportional to the determined number of interactions represented by each node of the plurality of nodes; and
   providing the generated visualization data for display.

2. The computer-implemented method of claim 1, further comprising:
   determining a total number of interactions represented by each node of the plurality of sequences of nodes; and
   arranging the intermediate nodes connected to the starting interactive node by an equal number of edges based on the total number of interactions of each of the intermediate nodes.

3. The computer-implemented method of claim 1, wherein the starting node is a user-designated starting node.

4. The computer-implemented method of claim 1, wherein each node of the plurality of sequences of nodes comprises one or more interactions that occurred within a user-designated timeframe.

5. The computer-implemented method of claim 1, further comprising:
   determining an end node for each sequence of nodes; and
   determining a total number of interactions represented by each end node.

6. The computer-implemented method of claim 1, further comprising:
   modifying a sequence of the plurality of sequences of nodes defined by the data to exclude a node connected to the starting node by more than a threshold number of edges.

7. The computer-implemented method of claim 6, wherein the threshold number is user-designated.

8. The computer-implemented method of claim 1, further comprising:
   providing display information for each node of the plurality of sequences of nodes, wherein the display information identifies a type of interaction represented by each node of the plurality of sequences of nodes as an event type interaction or a screen type interaction.

9. The computer-implemented method of claim 8, wherein the display information comprises a number of interactions represented by each node of the plurality of sequences of nodes.

10. The computer-implemented method of claim 1, further comprising:
    receiving a user selection of one of the visualized nodes;
    highlighting one or more sequences of the plurality of sequences of nodes, wherein each highlighted sequence includes the selected node, wherein a visual appearance of the highlighted one or more sequences differs from a visual appearance of one or more un-highlighted sequences.

11. The computer-implemented method of claim 10, further comprising:
    determining a number of interactions represented by each node of the highlighted nodes;
    for each highlighted node that precedes the selected node, determining a number of interactions represented by the preceding node that causes an interaction represented by the selected node; and
    providing for display, a ratio of the determined number of interactions to a total number of interactions represented by the preceding node;
    for each highlighted node that follows the selected node, determining a number of interactions represented by the subsequent node that results from an interaction represented by the selected node; and
    providing for display, a ratio of the determined number of interactions to the total number of interactions represented by the subsequent node; and
    providing for display, a total number of interactions represented by the selected node.

12. The computer-implemented method of claim 1, wherein a thickness of an edge that connects an intermediary node to the starting node is proportional to a number of interactions that proceed to the intermediary node from the starting node relative to a total number of interactions of the starting node.

13. The computer-implemented method of claim 12, wherein the edge has a thickness greater than a pre-selected threshold thickness.

14. The computer-implemented method of claim 12, further comprising:
receiving user-designated parameters for connecting each intermediary node to the starting node, wherein connecting each intermediary node to the starting node by an edge or a series of edges is based on the user-designated parameters.

15. A system for generating a flow based on multiple types of interactions, the system comprising:
one or more processors, and
a machine-readable medium comprising instructions stored therein, which when executed by the one or more processors, cause the one or more processors to perform operations comprising:
receiving data defining a plurality of sequences of nodes, a first node of a sequence of nodes associated with an event type interaction indicative of a user interaction action associated with an application provided on a device, a second node of the sequence of nodes associated with a screen type interaction of content displayed on a display screen of the device;
designating a node as a starting interactive node;
designating remaining nodes of each sequence of nodes of the plurality of sequences of nodes as intermediary nodes, wherein the intermediary nodes are in sequence from the starting node;
connecting each intermediary node to the starting node, wherein each connection of an intermediary node to the starting node comprises either an edge corresponding to a direct connection to the starting node or a series of edges corresponding to an indirect connection via at least one other intermediary node;
determining a total number of interactions represented by each node of the plurality of sequences of nodes;
arranging each intermediary node connected to the starting node based on a number of edges for each intermediary node and the total number of interactions of the each intermediary node;
generating visualization data for the plurality of sequences of nodes, wherein the visualization data comprises data to effect display of the starting node and the intermediary nodes that are connected to the starting node including the first node and the second node, wherein the generated visualization data for each node of the plurality of sequences of nodes includes data to effect display of each node as a surface having dimensions proportional to the determined number of interactions represented by each node of the plurality of nodes; and
providing the generated visualization data for display.

16. The system of 15, wherein the starting node is a user-designated starting node.

17. The system of claim 15, wherein each node of the plurality of sequences of nodes comprises one or more interactions that occurred within a user-designated timeframe.

18. The system of claim 15, further comprising:
determining an end node for each sequence of nodes; and
determining a total number of interactions represented by each of the end nodes.

19. The system of claim 15, further comprising:
modifying a sequence of the plurality of sequences of nodes defined by the data to exclude a node that is connected to the starting node by more than a threshold number of edges.

20. A machine-readable medium comprising instructions stored therein, which when executed by a processor, cause the processor to perform operations comprising:
receiving data defining a plurality of sequences of nodes, a first node of a sequence of nodes associated with an event type interaction indicative of a user interaction action associated with an application provided on a device, a second node of the sequence of nodes associated with a screen type interaction indicative of content displayed on a display screen of the device;
designating a node as a starting node;
designating remaining nodes of the plurality of sequences of nodes as intermediary nodes, wherein the intermediary nodes are in sequence from the starting node;
connecting each intermediary node to the starting node, wherein each connection of an intermediary node to the starting node comprises either an edge corresponding to a direct connection to the starting node or a series of edges corresponding to an indirect connection via at least one other intermediary node;
determining a total number of interactions represented by each node of the plurality of sequences of nodes;
arranging the intermediary nodes that are connected to the starting node by an equal number of edges based on the total number of interactions of each of the intermediary nodes;
generating visualization data for the plurality of sequences of nodes, wherein the visualization data comprises data to effect display of the starting node and the intermediary nodes that are connected to the starting node including the first node and the second node, wherein the generated visualization data for each node of the plurality of sequences of nodes includes data to effect display of each node as a surface having dimensions proportional to the determined number of interactions represented by each node of the plurality of nodes; and
providing the generated visualization data for display.

21. The machine-readable medium of 20, wherein the starting node is a user-designated starting node.

22. The machine-readable medium of claim 20, wherein each node of the plurality of sequences of nodes comprises one or more interactions that occurred within a user-designated timeframe.

23. The machine-readable medium of claim 20, further comprising:
modifying a sequence of the plurality of sequences of nodes defined by the data to exclude a node that is connected to the starting node by more than a threshold number of edges.

24. A computer-implemented method for generating a flow, the method comprising:
receiving data defining a plurality of sequences of nodes, a first node of a sequence of nodes associated with an event type interaction indicative of a user interaction action associated with an application provided on a device, a second node of the sequence of nodes associated with a screen type interaction indicative of content displayed on a display screen of the device;
assigning each of the nodes to coincide with a step;
determining a number of interactions represented by each of the nodes;

for each of the steps, organizing the nodes that coincide with the each step based on the determined number of interactions represented by each of the nodes;

generating visualization data for the plurality of sequences of nodes including the first node and the second node, wherein the generated visualization data for each node of the plurality of sequences of nodes includes data to effect display of each node as a surface having dimensions proportional to the determined number of interactions represented by each node of the plurality of nodes; and providing the generated visualization data for display.

25. The computer-implemented method of claim 24, further comprising:

designating a node as a node of interest; and arranging the nodes based on sequences that comprise the node of interest.

26. The computer-implemented method of claim 24, wherein each node of the plurality of sequences of nodes comprises one or more interactions that occurred within a user-designated timeframe.

27. The computer-implemented method of claim 24, further comprising:

modifying a sequence of the plurality of sequences defined by the data to limit length of the sequence-to be less than a threshold number of nodes.

28. The computer-implemented method of claim 24, wherein the threshold number of interactive nodes is user-designated.

29. A system for generating a flow, the system comprising:
one or more processors, and
a machine-readable medium comprising instructions stored therein, which when executed by the one or more processors, cause the one or more processors to perform operations comprising:

receiving data defining a plurality of sequences of nodes, a first node of a sequence of nodes associated with an event type interaction indicative of a user interaction action associated with an application provided on a device, a second node of the sequence of nodes associated with a screen type interaction indicative of content displayed on a display screen of the device, assigning each of the nodes to coincide with a step;

determining a number of interactions represented by each of the nodes;

for each of the steps, organizing the nodes that coincide with the each step based on the determined number of interactions represented by each of the nodes;

generating visualization data for the plurality of sequences of nodes including the first node and the second node, wherein the generated visualization data for each node of the plurality of sequences of nodes includes data to effect display of each node as a surface having dimensions proportional to the determined number of interactions represented by each node of the plurality of nodes; and providing the generated visualization data for display.

* * * * *